(12) United States Patent
Lewis et al.

(10) Patent No.: US 10,657,144 B2
(45) Date of Patent: *May 19, 2020

(54) OPTIMIZING DIGITAL VIDEO DISTRIBUTION

(71) Applicant: Google LLC, Mountain View, CA (US)

(72) Inventors: Justin Lewis, South San Francisco, CA (US); Ruxandra Georgiana Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,193

(22) Filed: May 24, 2019

(65) Prior Publication Data

US 2019/0278779 A1 Sep. 12, 2019

Related U.S. Application Data

(63) Continuation of application No. 15/240,861, filed on Aug. 18, 2016, now Pat. No. 10,346,417.

(51) Int. Cl.
*G06F 16/2457* (2019.01)
*G06F 16/438* (2019.01)
*H04N 21/45* (2011.01)
*H04N 21/845* (2011.01)
*H04N 21/431* (2011.01)
(Continued)

(52) U.S. Cl.
CPC ...... *G06F 16/24578* (2019.01); *G06F 16/438* (2019.01); *H04N 21/431* (2013.01); *H04N 21/44204* (2013.01); *H04N 21/4532* (2013.01); *H04N 21/4667* (2013.01);
(Continued)

(58) Field of Classification Search
CPC ........... H04N 21/407; H04N 21/25866; H04N 21/25891; H04N 21/442; H04N 21/44204; H04N 21/4632; H04N 21/466; H04N 21/4668; H04N 21/4667; H04N 21/438; H04N 21/431; H04N 21/4756; H04N 21/6125; H04N 21/6175; H04N 21/8146; G06F 16/438; G06F 16/24578
See application file for complete search history.

(56) References Cited

U.S. PATENT DOCUMENTS 8,572,647 B2 10/2013 Liu
8,789,108 B2 7/2014 Gibbs et al.
(Continued)

*Primary Examiner* — James R Sheleheda
(74) *Attorney, Agent, or Firm* — Fish & Richardson P.C.

(57) ABSTRACT

Systems, methods, and apparatus include computer programs encoded on a computer-readable storage medium, including a system for ranking videos. Videos are identified that have been presented at client devices. For each video, session start data is identified that specifies a lead video that initiated presentation to a user during a presentation session. For each lead video, presentation times over multiple user sessions are determined, a scaled presentation time is obtained, user sessions for which the lead video initiated presentation of videos are identified, and an aggregate video presentation time attributable to the lead video is determined. For each given video, a presentation score is determined based on a scaled presentation time of the lead video relative to a sum of the aggregate video presentation times for the lead videos. The videos are ranked based on the presentation scores. A user interface is updated to present the ranked videos.

20 Claims, 5 Drawing Sheets

(51) Int. Cl.
   *H04N 21/61*    (2011.01)
   *H04N 21/466*   (2011.01)
   *H04N 21/442*   (2011.01)
   *H04N 21/475*   (2011.01)

(52) U.S. Cl.
   CPC ..... *H04N 21/4756* (2013.01); *H04N 21/6125* (2013.01); *H04N 21/6175* (2013.01); *H04N 21/8456* (2013.01)

(56) References Cited

U.S. PATENT DOCUMENTS

| | | | |
|---|---|---|---|
| 9,619,520 B2 | 4/2017 | Rubchinsky | |
| 10,346,417 B2* | 7/2019 | Lewis | G06F 16/24578 |
| 2008/0177994 A1 | 7/2008 | Mayer | |
| 2009/0158337 A1 | 6/2009 | Stiers et al. | |
| 2010/0043020 A1 | 2/2010 | Basso | |
| 2010/0242060 A1 | 9/2010 | Liu | |
| 2011/0029666 A1* | 2/2011 | Lopatecki | G06F 15/16 |
| | | | 709/224 |
| 2011/0099488 A1* | 4/2011 | Jin | G06F 9/44 |
| | | | 715/764 |
| 2011/0271314 A1 | 11/2011 | Hoshall | |
| 2013/0057705 A1 | 3/2013 | Parker | |
| 2014/0006415 A1 | 1/2014 | Rubchinsky | |
| 2014/0278746 A1 | 9/2014 | Kolowich | |
| 2016/0380953 A1 | 12/2016 | Mashtakov | |
| 2017/0055014 A1 | 2/2017 | Bou Balust | |
| 2017/0134467 A1* | 5/2017 | Yoon | H04L 67/20 |
| 2017/0169644 A1 | 6/2017 | Rubchinsky | |
| 2017/0188102 A1 | 6/2017 | Zhang | |
| 2017/0193531 A1* | 7/2017 | Fatourechi | G06Q 30/0201 |
| 2017/0300570 A1* | 10/2017 | Chiarandini | H04N 21/2407 |
| 2017/0300571 A1* | 10/2017 | Chiarandini | G06F 16/78 |
| 2017/0311035 A1* | 10/2017 | Lewis | G06F 16/735 |
| 2017/0323018 A1* | 11/2017 | Angelova | G06F 16/435 |
| 2018/0052851 A1* | 2/2018 | Lewis | H04N 21/8456 |
| 2018/0324489 A1* | 11/2018 | Yu | H04N 21/2407 |
| 2019/0020920 A1* | 1/2019 | Lewis | G06F 16/735 |
| 2019/0141380 A1* | 5/2019 | Gordon | H04N 21/2665 |
| 2019/0286654 A1* | 9/2019 | Chiarandini | G06F 16/78 |

* cited by examiner

OPTIMIZING DIGITAL VIDEO DISTRIBUTION

CROSS-REFERENCE TO RELATED APPLICATIONS

This application is a continuation application of, and claims priority to, U.S. patent application Ser. No. 15/240,861, titled "OPTIMIZING DIGITAL VIDEO DISTRIBUTION," filed on Aug. 18, 2016. The disclosure of the foregoing application is incorporated herein by reference in its entirety for all purposes.

BACKGROUND

This document relates to digitized video distribution.

Video-sharing services provide a platform for video content creators to distribute digitized videos to other parties over a network, such as the Internet. The video-sharing service may be implemented by a computing system comprising one or more servers in one or more locations. Content creators can upload their videos to the computing system, along with metadata that describes their videos, which the computing system uses to index the videos and make them discoverable to users who express an interest in viewing such videos. The video-sharing service can then receive search queries from users requesting video content. In some instances, the video-sharing service provides videos that have been explicitly recommended through social messaging systems.

SUMMARY

This document generally describes systems, methods, devices, and other techniques for creating presentation scores and ranking videos based on determining lead videos that are attributed to presentation sessions. As used throughout this document, the terms optimize and optimization do not refer to a single optimal result. Rather, these terms refer to improvements in operations related to distributing videos over a communications network. For example, optimizations related to distribution of digital video can include improvements to ranking techniques that reduce the amount of time required (or number of videos previewed) for a user to be presented a given video.

In general, one aspect of the subject matter described in this specification can be implemented in systems that include one or more processing devices and one or more storage devices. The storage devices store instructions that, when executed by the one or more processing devices, cause the one or more processing devices to perform operations including: identifying, by one or more servers, various videos that have been presented at various different client devices that are remotely located relative to one or more computing devices that distribute the various videos for an online video distribution service; for each of the various videos, identifying session start data of a user within the online video distribution service, wherein the session start data specifies a lead video that initiated video presentation to the user during a given presentation session; for each lead video: determining various presentation times of the lead video over multiple user sessions, obtaining a scaled presentation time for each lead video presentation, including applying a scaling factor to the determined presentation time for the lead video presentation, identifying the user sessions for which the lead video initiated presentation of videos to a user, and determining an aggregate video presentation time attributable to the lead video based on the scaled presentation time of the lead video for each of the identified user sessions and a total presentation time of other videos during the identified user sessions; generating, for each given video among the various videos, a presentation score based on an amount of presentation time of the given video relative to a sum of the aggregate video presentation times for the lead videos, wherein the presentation score for each lead video is generated based on the scaled presentation time of the lead video relative to the sum of the aggregate video presentation times for the lead videos; ranking the various videos based on the presentation scores; and updating a user interface of the online video distribution service to present at least a portion of the ranked videos at a client device according to the ranking.

These and other implementations can each optionally include one or more of the following features. The operations can further include: for each lead video specified by the session start data for the various videos: classifying the lead video as one of an in-service initiated video presentation or a remotely initiated video presentation, wherein applying a scaling factor to the determined presentation time for the lead video presentation includes: applying a first scaling factor to the determined presentation time for in-service initiated video presentations of a lead video; and applying a second scaling factor to the determined presentation time for remotely initiated video presentations of a lead video, wherein the first scaling factor is lower than the second scaling factor. The operations can further include identifying remotely initiated video presentations of a lead video based on referrer information included in a request to present the lead video, wherein the referrer information specifies one of a third-party website that directed a user to the online video distribution service, a third-party native application that directed a user to the online video distribution service, or shared link that directed a user to the online video distribution service. The operations can further include identifying search queries that resulted in a given lead video being identified to various users in search results; for each of the search queries, determining a portion of the various users that initiated presentation of the given lead video through interaction with the search results; and determining, based on the determined portions, search scaling factors to apply to the determined presentation time of the lead video for the presentations of the given lead video that was initiated through user interaction with the search results that identified the given lead video. The operations can further include identifying a creator that supplies one or more of the various videos. The operations can further include generating a creator score for the creator based on the presentation score of the one or more of the various videos provided by the creator; and ranking the creator among other creators based, at least in part, on the creator score. The operations can further include distributing, to the creator, a portion of proceeds attributable to the one or more of the various videos supplied by the creator based on the presentation scores of the one or more of the various videos.

In general, another innovative aspect of the subject matter described in this specification can be implemented in methods, including a method that includes: identifying, by one or more servers, various videos that have been presented at various different client devices that are remotely located relative to one or more computing devices that distribute the various videos for an online video distribution service; for each of the various videos, identifying session start data of a user within the online video distribution service, wherein the session start data specifies a lead video that initiated video presentation to the user during a given presentation session; for each lead video: determining various presentation times of the lead video over multiple user sessions, obtaining a scaled presentation time for each lead video presentation, including applying a scaling factor to the determined presentation time for the lead video presentation, identifying the user sessions for which the lead video initiated presentation of videos to a user, and determining an aggregate video presentation time attributable to the lead video based on the scaled presentation time of the lead video for each of the identified user sessions and a total presentation time of other videos during the identified user sessions; generating, for each given video among the various videos, a presentation score based on an amount of presentation time of the given video relative to a sum of the aggregate video presentation times for the lead videos, wherein the presentation score for each lead video is generated based on the scaled presentation time of the lead video relative to the sum of the aggregate video presentation times for the lead videos; ranking the various videos based on the presentation scores; and updating a user interface of the online video distribution service to present at least a portion of the ranked videos at a client device according to the ranking.

These and other implementations can each optionally include one or more of the following features. The method can further include: for each lead video specified by the session start data for the various videos: classifying the lead video as one of an in-service initiated video presentation or a remotely initiated video presentation, wherein applying a scaling factor to the determined presentation time for the lead video presentation includes: applying a first scaling factor to the determined presentation time for in-service initiated video presentations of a lead video; and applying a second scaling factor to the determined presentation time for remotely initiated video presentations of a lead video, wherein the first scaling factor is lower than the second scaling factor. The method can further include identifying remotely initiated video presentations of a lead video based on referrer information included in a request to present the lead video, wherein the referrer information specifies one of a third-party website that directed a user to the online video distribution service, a third-party native application that directed a user to the online video distribution service, or shared link that directed a user to the online video distribution service. The method can further include identifying search queries that resulted in a given lead video being identified to various users in search results; for each of the search queries, determining a portion of the various users that initiated presentation of the given lead video through interaction with the search results; and determining, based on the determined portions, search scaling factors to apply to the determined presentation time of the lead video for the presentations of the given lead video that was initiated through user interaction with the search results that identified the given lead video. The method can further include identifying a creator that supplies one or more of the various videos. The method can further include generating a creator score for the creator based on the presentation score of the one or more of the various videos provided by the creator; and ranking the creator among other creators based, at least in part, on the creator score. The method can further include distributing, to the creator, a portion of proceeds attributable to the one or more of the various videos supplied by the creator based on the presentation scores of the one or more of the various videos.

In general, another aspect of the subject matter described in this specification can be implemented a non-transitory computer storage medium encoded with a computer program. The program can include instructions that when executed by a distributed computing system cause the distributed computing system to perform operations including identifying, by one or more servers, various videos that have been presented at various different client devices that are remotely located relative to one or more computing devices that distribute the various videos for an online video distribution service; for each of the various videos, identifying session start data of a user within the online video distribution service, wherein the session start data specifies a lead video that initiated video presentation to the user during a given presentation session; for each lead video: determining various presentation times of the lead video over multiple user sessions, obtaining a scaled presentation time for each lead video presentation, including applying a scaling factor to the determined presentation time for the lead video presentation, identifying the user sessions for which the lead video initiated presentation of videos to a user, and determining an aggregate video presentation time attributable to the lead video based on the scaled presentation time of the lead video for each of the identified user sessions and a total presentation time of other videos during the identified user sessions; generating, for each given video among the various videos, a presentation score based on an amount of presentation time of the given video relative to a sum of the aggregate video presentation times for the lead videos, wherein the presentation score for each lead video is generated based on the scaled presentation time of the lead video relative to the sum of the aggregate video presentation times for the lead videos; ranking the various videos based on the presentation scores; and updating a user interface of the online video distribution service to present at least a portion of the ranked videos at a client device according to the ranking.

These and other implementations can each optionally include one or more of the following features. The operations can further include: for each lead video specified by the session start data for the various videos: classifying the lead video as one of an in-service initiated video presentation or a remotely initiated video presentation, wherein applying a scaling factor to the determined presentation time for the lead video presentation includes: applying a first scaling factor to the determined presentation time for in-service initiated video presentations of a lead video; and applying a second scaling factor to the determined presentation time for remotely initiated video presentations of a lead video, wherein the first scaling factor is lower than the second scaling factor. The operations can further include identifying remotely initiated video presentations of a lead video based on referrer information included in a request to present the lead video, wherein the referrer information specifies one of a third-party website that directed a user to the online video distribution service, a third-party native application that directed a user to the online video distribution service, or shared link that directed a user to the online video distribution service. The operations can further include identifying search queries that resulted in a given lead video being identified to various users in search results; for each of the search queries, determining a portion of the various users that initiated presentation of the given lead video through interaction with the search results; and determining, based on the determined portions, search scaling factors to apply to the determined presentation time of the lead video for the presentations of the given lead video that was initiated through user interaction with the search results that identified the given lead video. The operations can further include identifying a creator that supplies one or more of the various videos. The operations can further include generating a creator score for the creator based on the presentation score of the one or more of the various videos provided by the creator; and ranking the creator among other creators based, at least in part, on the creator score.

In some implementations, the techniques described herein may realize, in certain instances, one or more of the following advantages. Relevant videos can be surfaced with fewer clicks, less data transfer, and reduced search time. Videos that are associated with a user's intent to watch, such as specific videos identified by a friend, can be ranked higher for presentation than videos that are merely recommended by an online video distribution service. As such, a more optimized video distribution system is provided.

DESCRIPTION OF DRAWINGS

Like references among the various drawings indicate like elements.

DETAILED DESCRIPTION

Figure 1:
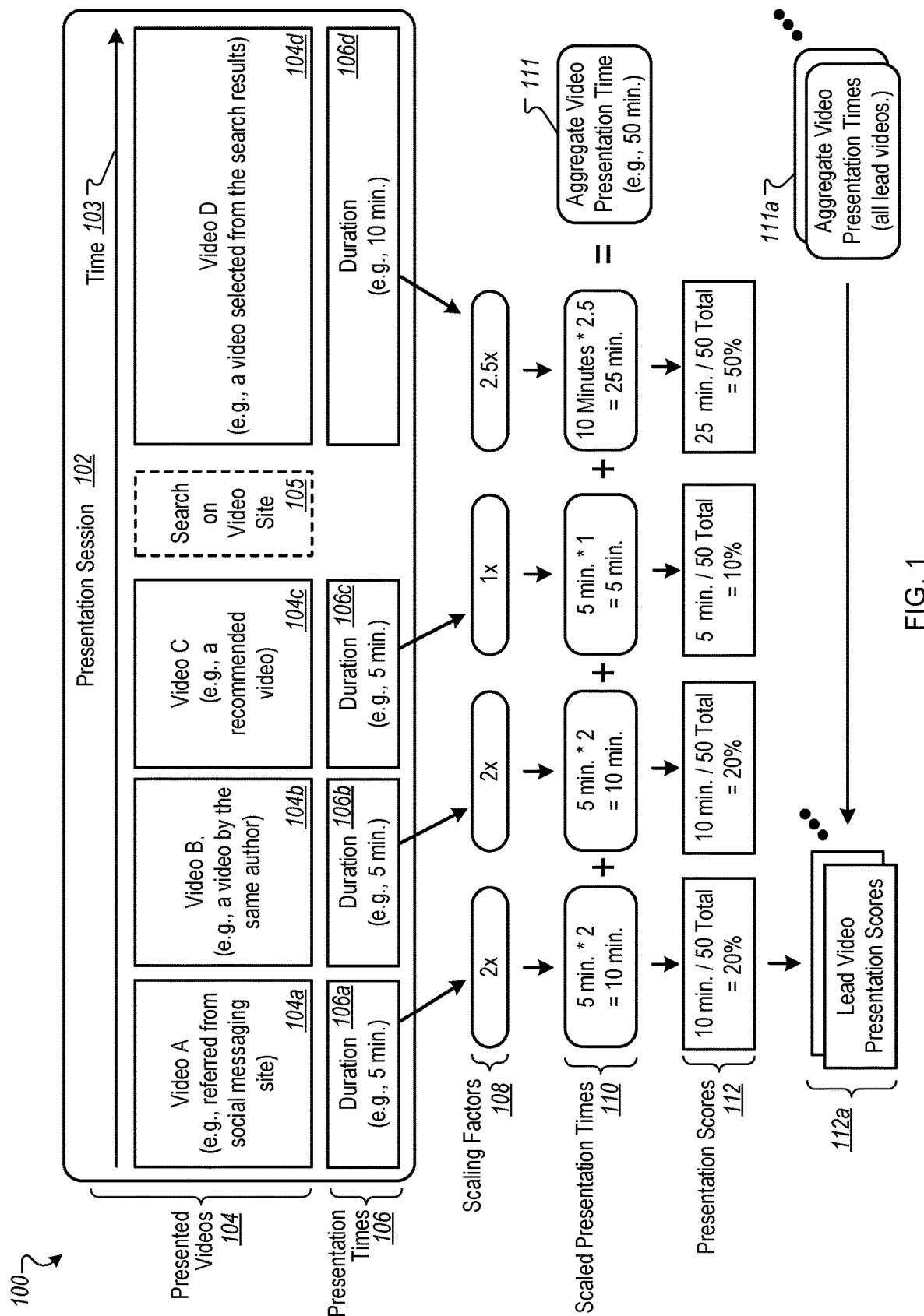
FIG. 1 illustrates a conceptual diagram of video presentation and the use of scaling factors to determine presentation scores for videos.

This document generally describes systems, methods, devices, and other techniques for creating presentation scores and ranking videos based on determining lead videos that are attributed to presentation sessions. For example, a lead video can be a video that is identified as initiating or leading (e.g., presented first within) a given presentation session, such as a specific video selected and initiated from a link outside of an online video distribution service. Ranking lead videos higher, for example, can optimize the presentation and/or suggestion of videos by surfacing videos that actually direct (e.g., start presentation sessions on) the online video distribution service. For example, videos that have brought a user to an online video distribution service can be ranked higher than videos that are simply recommended by the online video distribution service after the user is already interacting with the video distribution service. This means that a specific video recommended by another user on a social messaging system can be ranked higher than popular videos that are selected by the online video distribution service as relevant to a given search query.

A computing system may implement the online video-sharing service that hosts videos submitted by a collection of independent creators and makes the creators' videos available for distribution over a network (e.g., the Internet) to one or more viewers. Viewers may access the video-sharing service on respective client devices and search videos that that are hosted on the service. The system may also present to viewers recommendations likely to be of interest to the viewers.

In some implementations, the ranking and other aspects described in this document can be used as a ranking mechanism for user-generated content (UGC) as well as a mechanism for distributing compensation among video creators that provided videos viewed over the course of a presentation session. For example, the rankings of videos presented during a given presentation session (or across multiple presentation sessions) can be adjusted disproportionately based on which of the presented videos brought a user to the online video distribution service and which of the presented videos were recommended to the user after the user arrived at the video distribution service. In some implementations, the source of a presentation session can be identified, such as by identifying the first video presented during a given presentation session as the lead video of the presentation session. Subsequently, when a video identified as a lead video is selected to appear in search results, the rank of the video can be increased. Similar, compensation provided to creators of lead videos can utilize a similar disproportionate adjustment mechanism, as described below.

Ranking of videos can be based, at least in part, on presentation scores that are determined for each video. For example, the presentation score of a given video can be based on an amount of presentation time of the given video relative to a sum of the aggregate video presentation times for lead videos, or relative to a sum of presentation times for videos in a same presentation session. However, for videos that are determined to be lead videos, each lead video can be assigned a presentation score that reflects the lead video's contribution to a given presentation session that is attributable to the lead video. Further, the presentation score for the lead video can be affected by other lead videos. For example, the presentation score for the lead video can be generated based on a scaled presentation time of the lead video relative to the sum of the aggregate video presentation times for the lead videos. The scaled presentation time for the lead video can be a function of the determined (e.g., actual) presentation time of the video and a scaling factor. Scaling factors (e.g., greater than 1) that are applied to lead videos, for example, can result in a higher presentation score for (and subsequent higher ranking of) a lead video relative to non-lead videos.

FIG. 1 illustrates a conceptual diagram of video presentation and the use of scaling factors to determine presentation scores for videos. For example, a presentation session 102 (e.g., presented left-to-right over time 103) includes a sequence of presented videos 104 and a search 105 on a video site, such as a web site of an online video distribution service. The presented videos 104 have associated presentation times 106, such as presentation times 106a-106c of five minutes for each of the presented videos 104a-104c, and a presentation time 106d of ten minutes for presented video 104d.

In one example sequence of events, a user using a social messaging system (e.g., reading a friend's post) can click on a link for the presented video A 104a created by Creator 1. This can cause initiation of the presentation session 102, such as a presentation session on the online video distribution service. For example, clicking the link can automatically initiate opening, by a client device, a video application associated with the online video distribution service and initiating the playing/streaming of video A 104a. After video A 104*a* is presented for five minutes, for example, the user may be presented with one or more other videos for an additional 20 minutes, including videos selected by the user from related recommended videos uploaded by various creators different from Creator 1. In the example shown in FIG. 1, the additional 20 minutes can start with video B 104*b*, which may also be referred from the same social messaging system from which video A 104*a* was referred. Assume that the next video to be presented is video C 104*c*, e.g., a video recommended by the online video distribution service. During the same presentation session, the user may perform a search 105 on the video site, from which video D 104*d*, a video selected form the resulting search results, is selected for presentation. In this example, videos C 104*c* and D 104*d* are assumed not to be associated with (e.g., provided by) Creator 1.

Video A 104*a* can be determined to be a lead video attributable to the presentation session 102, e.g., being the reason that the presentation session 102 was initiated (and that the other videos were presented). In order to recognize the contribution of the lead video in this example, a presentation score for the lead video can be determined based, at least in part, on a scaling factor associated with the lead video. For example, a scaling factor of 2 (or some other value) can be applied to the five-minute presentation time of video A 104*a*, e.g., resulting in a scaled presentation time, e.g., ten minutes. The ten-minute scaled presentation time can be added to the total (e.g., 40 minutes) of presentation times of other videos, resulting in an aggregate video presentation time 111 of 50 minutes for videos in the presentation session.

Scaling factors 108 of 2, 2, 1 and 2.5 can be determined for the Videos 104*a*-104*d*, respectively. Using the scaling factors 108, corresponding scaled presentation times 110 can be determined, e.g., scaled presentation times 110 of 10, 5 and 25 minutes that are associated with videos 104 having scaling factors 108 of 2, 1 and 2.5, respectively.

In some implementations, during the course of a presentation session, multiple videos can be marked as the lead video. For example, if video B 104*b* has the same author (e.g., Creator 1) as video A 104*a* and is presented immediately after (or in the same presentation session as) video A 104*a*, then video B 104*b* can also be identified as a lead video within the presentation session 102. The scaling factor 108 for video B 104*b* can be the same, or can be slightly lower than, the scaling factor 108 for video A 104*a*. As a result, multiple lead videos can be defined for one or more presentation sessions associated with the user during a 24-hour period, e.g., within a same presentation session or during any period that is defined by the user's arrival and subsequent departure (or determined inactivity) on the online video distribution service.

In some implementations, a lead video's scaling factor can be applied in various ways. For example, in a simplistic model approach, a constant scaling factor can be applied to the presentation time of only the video itself, such as two times in the above example. In some implementations, an additive constant (e.g., five minutes) can be used that incentivizes short videos that initiate longer presentation sessions as opposed to only incentivizing long videos. In some implementations, a scaling factor can be applied to all videos associated with the creator of a lead video, e.g., if the videos are presented during the presentation session, thus rewarding the creator for the creator's total presence in the presentation session rather than just for the first video. In some implementations, variable scaling factors can depend on the source of the lead video. For example, the scaling factor for a video associated with a deep link (e.g., a hypertext link other than a home page) can be greater than the scaling factor for a video associated with a link for a home page, which in turn can be greater than the scaling factor for a video identified from a search.

The source of the lead video can be classified in various ways. For example, a first-party navigation classification can be used when the user navigates using a first-party action such as following a notification, recommendation, first-party share, or other user action. The "first-party" nomenclature in these examples refers to the user having a direct relationship with another user (e.g., who recommends a specific video) or an explicit action by the user outside of the online video distribution service. Each of these different types of navigation can be classified differently, e.g., resulting in different scaling factors being applied. A web referrer classification, for example, can be used if the referrer (e.g., a user on a social messaging system) can be identified so that a determination can be made as to which web site the user has come from in order to be presented videos on the online video distribution service. In some implementations (e.g., some mobile native environments), the referrer can be identified so as to identify the website or application from which the user originated. In some implementations, identification of the originating website or application can be achieved by the referring service by adding extra metadata to a URL, or by providing referrer (e.g., application intents) to the URL to provide context about the originating web site or application.

In some implementations, attribution tags (e.g., using bundled URLs) can be used to mark shared links so that downstream views can be attributed to a sharer of the video. Attribution tags can also be used, for example, as a proxy for application or website information where none exists.

In some implementations, scaling factors for presentation times can be adjusted based on the total amount of time the user was presented videos, such as to generate higher presentation scores for short videos that lead to long presentation sessions. For example, a scaling factor can be based on be a sliding scale between a 300% and 120% scaling factor between 5 minutes and 30 minutes. In this way, short videos that start long presentation sessions can be valued (e.g., using scaling factors) similarly to long videos that generate similarly long presentation sessions. Scaling factors can be used to generate presentation scores for videos, which can affect the order of presentation of videos in search results.

Search results might be divided into different types that each affect the source scaling factor in a different way. For example, an express search (e.g., using a specific title) for a particular video or channel can have a very high source scaling factor. A general search (e.g., using keywords in a search query) can have a very low source scaling factor because the user was presented with the video that was delivered in search results (as opposed to it being the specific video identified by title). The specificity of a video search can be determined, for example, by looking at a percentage of users who clicked on a search result from the channel. In some implementations, if the majority of users clicked on the same video or videos uploaded by the same creator for a particular search term, then searches with that term can be considered to be an explicit search.

Video creators can be compensated for bringing users to an online video distribution service. For example, video creators can be compensated more if their videos cause the start of a presentation session even if a majority of video presentation time in the presentation session comes is associated with videos that are recommend by the online video distribution service. In this way, top-tier creators whose video content brings users to the online video distribution service can be compensated more than creators whose videos are presented as a result of on-site video recommendations.

In some implementations, content creators are not paid just for the sponsored content that show up on their videos, but additionally (or instead) can be paid based on the value that they bring to the online video distribution service or the viewer. For example, the revenue from a presentation session on a video sharing site can be totaled and then divided among the video creators based on a presentation scores of each video within the presentation session.

Figure 2:
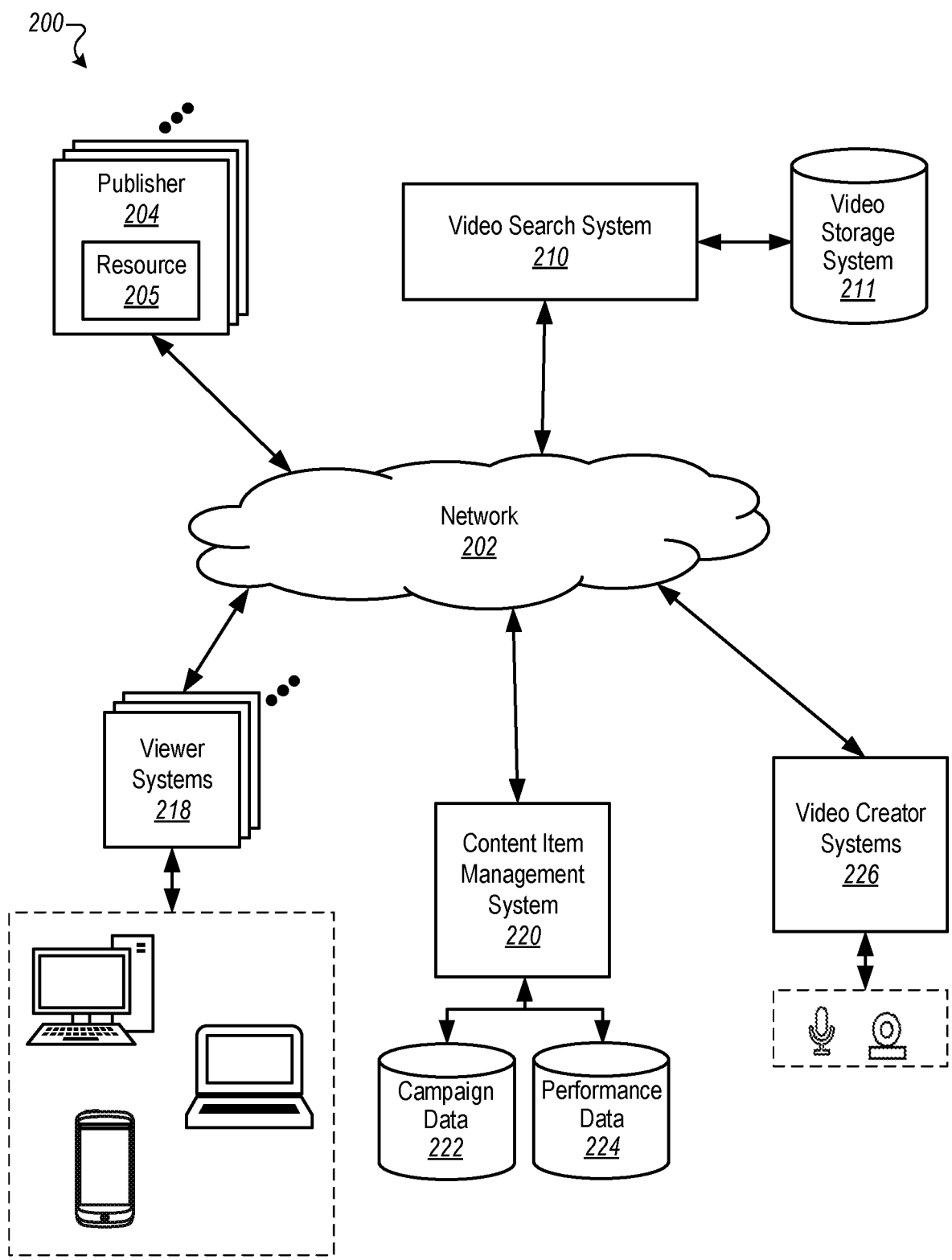
FIG. 2 depicts a block diagram of an example environment in which videos are presented and scaling factors are used to determine scaled presentation times and presentation scores for videos.

FIG. 2 depicts a block diagram of an example environment 200 in which videos are presented and scaling factors are used to determine scaled presentation times and presentation scores for videos. A data communication network 202 enables data communication between multiple electronic devices and systems. In this environment 200, users can access video content, provide video content, exchange information, and search for videos over the data communication network 202. The data communication network 202 can include, for example, a local area network (LAN), a cellular phone and data network, a wide area network (WAN), e.g., the Internet, or a combination of these and other networks. The links on the network can be wireline or wireless links or both. Video content creators can also generate and create videos to share over the data communication network 202 using video creator systems 226.

In some implementations, the environment 200 includes a video search system 210. In operation, the video search system 210 can implement a video-sharing service (e.g., an online video distribution service) that enables various parties (creators) to make digitized videos available for online distribution to other parties (viewers). The video-sharing service may be accessed from a website or applications associated with one or more domains. For example, parties may upload original video content to the video search system 210, and the video search system 210 can store and index the videos in the video storage system 211. Viewers at viewer systems 218 may then query the video search system 210 to request video content according to one or more preferences of the viewers. In some implementations, the video search system 210 is configured to provide video content to users in which selection and monetization of the videos depends on the application of scaling factors to presentation times. The details of the video search system 210 and video storage system 211 are described further herein with respect to FIG. 3.

Generally, each viewer can access videos through a viewer system 218 associated with the respective viewer. A given viewer system 218 can include an electronic device, or collection of devices, capable of requesting, receiving, and playing videos over the data communication network 202. Example viewer systems 218 may include one or more of a smartphone, a tablet computing device, a notebook computer, a desktop computers, a smart television device, a wearable computing device, a virtual reality device, an augmented reality device, or a combination of two or more of these. The viewer system 218 may include a user application, e.g., a web browser or a native media player application that sends and receives data over the data communication network 202, generally in response to user actions. The web browser can enable a user to display and interact with text, images, videos, music and other information typically located on a web page at a website on the Internet or a local area network. The media player application may play digitized videos downloaded or streamed from the video search system 210, and may generate presentation time reports that are transmitted back to the video search system 210 to identify how viewers were presented with served videos on the viewer systems 218.

In some implementations, the environment 200 can include a publisher website 204 includes one or more resources 205 associated with a domain and hosted by one or more servers in one or more locations. Generally, a website is a collection of web pages formatted in hypertext markup language (HTML) that can contain text, images, multimedia content (e.g., videos), and programming elements, for example, scripts. Each publisher website 204 is maintained by a content publisher, which is an entity that controls, manages and/or owns the publisher website 204. The publisher websites 204 can provide a variety of different web pages, such as web pages that present videos hosted by the video-sharing service at video search system 210.

A resource 205 in this context can include any data that is provided by the publisher website 204 over the data communication network 202 and that has a resource address, e.g., a uniform resource locator (URL). Resources may be HTML pages, electronic documents, images files, video files, audio files, and feed sources, to name just a few. The resources may include embedded information, e.g., meta information and hyperlinks, and/or embedded instructions, e.g., client-side scripts.

In some implementations, the environment 200 can include a content item management system 220, which generally provides content items (e.g., advertisements) for presentation with videos that the video search system 210 serves to viewer systems 218. In some implementations, the content item management system 220 allows content providers to define selection rules that take into account characteristics of a particular video viewer to provide relevant content to the viewer. Example selection rules include keyword selection, in which the content providers specify content selection criteria for content associated with keywords that are present in either search queries, videos, or video content metadata.

The content item management system 220 can include a data storage system that stores campaign data 222 and performance data 224. The campaign data 222 can store, for example, content items, selection information, and budgeting information for content providers. The performance data 224 can store data indicating the performance of the content items that are served. Such performance data can include, for example, click-through rates for content items, the number of impressions for content items, and the number of resulting conversions associated with the impressions.

In some implementations, the campaign data 222 and the performance data 224 can be used as input to a content item selection procedure. In particular, the content item management system 220, in response to each request for content, conducts a selection procedure to select items that are provided in response to the request. The content item management system 220 can rank content items according to a score that, in some implementations, is proportional to a value based on a content item passed on performance data 224.

Figure 3:
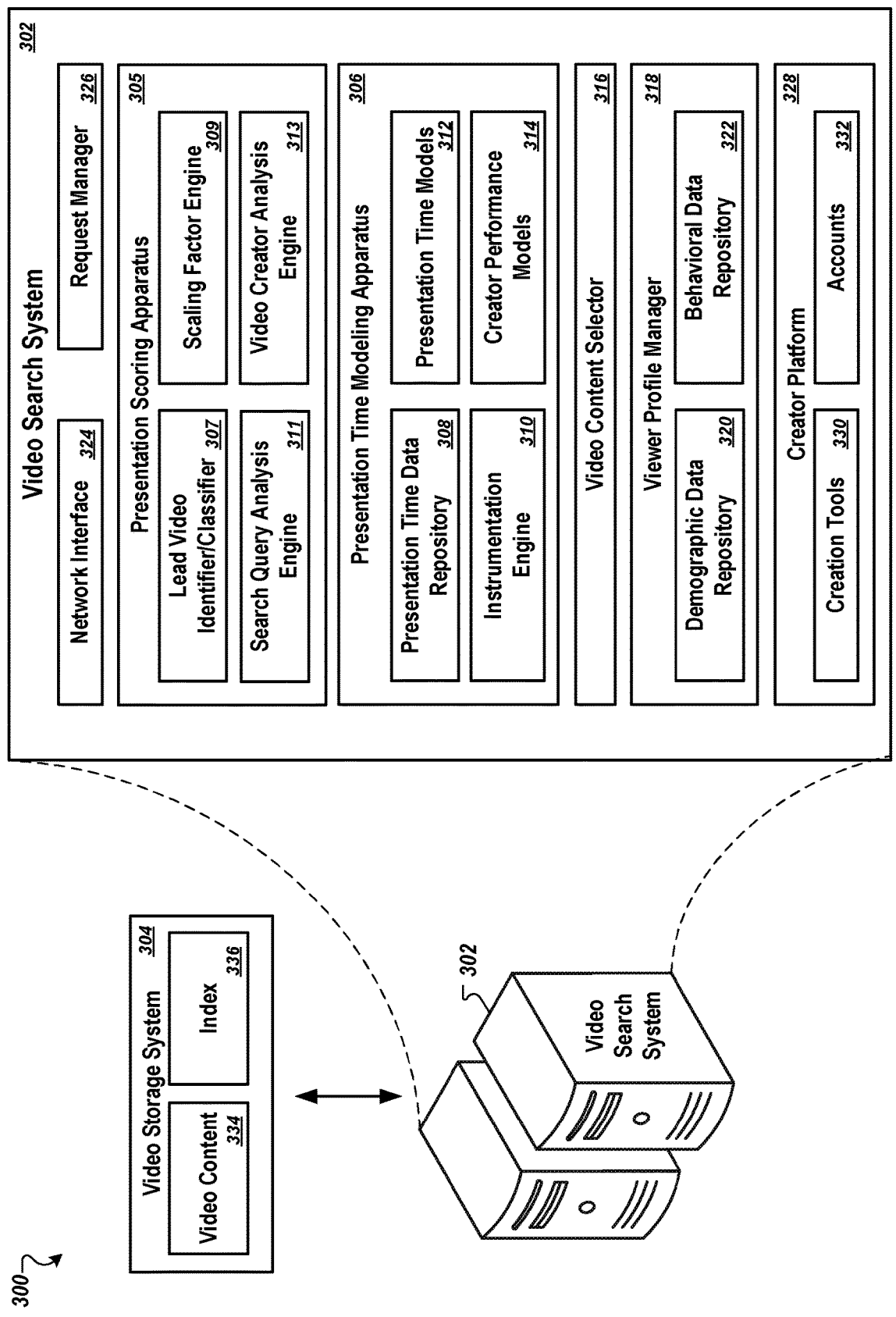
FIG. 3 shows a block diagram of an example computing system, including a video search system and a video storage system, in which videos are presented and scaling factors are used to determine scaled presentation times for videos.

Turning to FIG. 3, a block diagram is shown of an example computing system 300, including a video search system 302 and a video storage system 304, in which videos are presented and scaling factors are used to determine scaled presentation times for videos. In some implementations, the video search system 210 of FIG. 2 may be implemented as the video search system 302 of FIG. 3. In some implementations, the video storage system 211 may be implemented as the video storage system 304 of FIG. 3. In some implementations, the computing system 300 may further be configured to carry out the process 400, which are represented by the flowchart in FIG. 4. Each of the video search system 302 and the video storage system 304 may be implemented on one or more computers in one or more locations. The computers of the systems 302 and 304 may be implemented by a combination of software and hardware as depicted and described with respect to FIG. 5.

In some implementations, the video search system 302 provides an online video-sharing service in which various parties can upload digitized videos to the service to make the videos available for distribution to one or more other parties. For the purpose of this document, the parties that submit (e.g., upload) videos for distribution through the service are referred to as creators, and the parties that are presented with videos through the service are referred to as viewers. In many cases, "creators" may include parties that organically created their own videos to share with others, but "creators" may also refer to parties who upload content that was actually created by one or more other parties but which the first party wishes to share on the service. The video search system 302 may include a creator platform 328 that provides an interface for creators to submit and monitor the performance of their videos on the sharing service. Creators may register with accounts 332 with the service and may use various tools 330 to facilitate video content creation and distribution.

In some implementations, the video search system 302 may enforce policies and technological restrictions to prevent parties from distributing content through the video-sharing service without proper authorization from the original creator of the content. The video search system 302 is generally operable to select video content to provide as recommendations to users or as responses to search queries submitted by users, based at least in part on presentation time information that indicates how long users in different viewer categories have viewed different videos. In some implementations, viewers can stream digitized videos hosted by the computing system 300. In some implementations, viewers can download all or portions of digitized videos hosted by the computing system 300 to allow the viewers to watch the videos offline at later times, for example.

The video storage system 304 is generally responsible for storing, maintaining, and indexing video content for videos that have been made available for distribution on the video-sharing service. The video storage system 304 can include a video content repository 334 and an index 336. The video storage system 304 includes one or more processors and one or more storage devices in one or more locations that store video content for a large number of digitized videos. For example, when a creator uploads a video to the video search system 302 for sharing, the video file can be provided to the video storage system 304, processed (e.g., compressed and made to conform to one or more standard resolutions), stored, and indexed for searching. Generally, video content may include the actual digitized video itself as well as pertinent metadata about the digitized video. For example, the video content repository 334 may identify a title, a short textual description, and a creator ID for a given video, and correlate the metadata with the digitized video file in the video storage system 304. The index 336 includes information that makes the video content searchable, such as references to the identified metadata for various videos, hash tables, or the like. The video storage system 304 and the video search system 302 can pass messages between each other to identify and provide video content that is to be served to computing devices separate from the computing system 300 (e.g., over the Internet).

In some implementations, the video search system 302 can include a presentation scoring apparatus 305, a presentation time modeling apparatus 306, a video content selector 316, a viewer profile manager 318, a network interface 324 (e.g., front-end server), a request manager 326, a creator platform 328, or a combination of all or some of these components. Each of the components may generally be implemented as a combination of hardware and software of one or more computers in one or more locations, such as computers described with respect to FIG. 5.

The network interface 324 is generally configured to enable network communications for the video search system 302. The network interface 324 can receive from creators' computing devices requests to make digitized video content available for distribution on the sharing service provided by the video search system 302. The network interface 324 can also receive from viewers' computing devices requests to provide shared video content for presentations to the viewers and can serve video content to the viewers' computing devices responsive to their requests.

The request manager 326 is generally configured to process requests received from computing devices remote from the video search system 302, as indicated by the network interface 324. For requests for video content from viewers' computing devices, the request manager 326 can analyze the request to identify one or more selection criteria for video content that is to be served to the viewers' computing devices responsive to the requests. The selection criteria may be expressly indicated in the content of a given request and/or the selection criteria may be identified from data sources external to the request, based on information associated with the request. As an example, some requests may expressly include a search query that identifies one or more terms entered and submitted by a viewer, where the terms indicate topics of video content that the user has targeted for a search.

Some requests, however, may not include a search query or otherwise may not expressly identify topics of video content that has been requested. The request manager 326 may nevertheless identify topics or other selection criteria for the request based on circumstantial data or metadata associated with the request, such as an identity of the user to whom the video content is to be presented, a timestamp assigned to the request indicating a time that the request was submitted, or location information that indicates a location of the user to whom the requested video content is to be submitted. For example, the request manager 326 can identify the targeted viewer based on analysis of the request, and then one or more characteristics of the user can be identified from the viewer profile manager 318 and used by the video content selector 316 as selection criteria for determining video content to serve in a response to the request. A video content request may not include a query, for example, when the video search system 302 is requested to provide a recommendation for video content to a user, such as when the user first accesses a homepage of the video-sharing service and before the user has entered a query, so that the user is automatically presented with options for viewing digitized videos of potential interest to the user merely by virtue of having visited the homepage.

The presentation scoring apparatus 305 is generally configured to generate presentation scores for various videos in a presentation session based on an amount of presentation time of a given video relative to a sum of aggregate video presentation times for videos in the presentation session. For example, each presentation score can depend on an aggregate video presentation time for the videos in the presentation session. Videos that are determined to be lead videos in the presentation session, for example, can have scaled presentation times that are increased (e.g., higher than non-lead videos) based on the application of scaling factors.

A lead video identifier/classifier 307 can perform operations associated with identifying and classifying lead videos. For example, for each lead video, the lead video identifier/classifier 307 can use information from a presentation time data repository 308 to determine various presentation times of the lead video over multiple presentation sessions. The lead video identifier/classifier 307 can obtain a scaled presentation time for each lead video presentation, including applying a scaling factor (e.g., obtained from a scaling factor engine 309) to the determined presentation time for the lead video. The lead video identifier/classifier 307 can also identify the presentation sessions for which the lead video resulted in the presentation of a group of videos to a user. Using scaling factors obtained from the scaling factor engine 309, the lead video identifier/classifier 307 can determine an aggregate video presentation time attributable to the lead video based on the scaled presentation time of the lead video for each of the identified presentation sessions and a total presentation time of other videos during the identified presentation sessions.

The scaling factor engine 309 can generate, for each given video among the various videos, a presentation score based on an amount of presentation time of the given video relative to a sum of the aggregate video presentation times for the lead videos. The presentation score for each lead video can be generated based on the scaled presentation times of the lead video relative to the sum of the aggregate video presentation times for the lead videos. The scaling factor engine 309 can rank the various videos based on the presentation scores. The video search system 302 can update a user interface of the online video distribution service to present at least a portion of the ranked videos at a client device according to the ranking.

In some implementations, the presentation scoring apparatus 305 can use information and services of the lead video identifier/classifier 307 and the scaling factor engine 309 to apply various scaling factors that depend on the source of the lead video. For example, for each lead video specified by the presentation session start data for the various videos, the lead video identifier/classifier 307 can classify the lead video as one of an in-service initiated video presentation (e.g., selected by the user from a list of recommendations) or a remotely initiated video presentation (e.g., through a specific link to a video provided by a friend). The scaling factor engine 309 can apply a scaling factor to the determined presentation time for the lead video in various ways. For example, a first (e.g., lower) scaling factor can be applied to the determined presentation time for in-service initiated video presentations of a lead video, and a second (e.g., higher) scaling factor can be applied to the determined presentation time for remotely initiated video presentations of a lead video. In some implementations, the 302 can distribute, to the creator of a video, a portion of proceeds attributable to the one or more of the various videos supplied by the creator based on the presentation scores of the one or more of the various videos.

A search query analysis engine 311 can generate and use search scaling factors that are applied to presentation times based on search queries that are the source of lead videos. For example, the search query analysis engine 311 can identify search queries that resulted in a given lead video being identified to various users in search results. For each of the search queries, the search query analysis engine 311 can determine a portion of the various users that initiated presentation of the given lead video through interaction with the search results. The scaling factor engine 309 can determine, based on the determined portions, search scaling factors to apply to the determined presentation time of the lead video for the presentations of the given lead video that was initiated through user interaction with the search results that identified the given lead video.

A video creator analysis engine 313 can perform operations associated with identifying and characterizing video creators. For example, the video creator analysis engine 313 can identify a creator that supplied one or more of the various videos, generate a creator score for the creator (e.g., based on the presentation score of the one or more of the various videos provided by the creator), and rank the creator among other creators based, at least in part, on the creator score.

The presentation time modeling apparatus 306 is generally configured to determine models for scoring videos, creators, or both based on presentation time data that identifies how long various viewers having different characteristics have viewed various digitized videos hosted by the video search system 302 (and stored on the video storage system 304). As with other components and sub-components of the video search system 302, the presentation time modeling apparatus 306 can comprise one or more computers in one or more locations, including one or more processors and/or one or more computer-readable storage devices. The presentation time modeling apparatus 306 can include a presentation time data repository 308, an instrumentation engine 310, one or more presentation time models 312, one or more creator performance models 314, or a combination of these.

In some implementations, the presentation time modeling apparatus 306 can also use information in the presentation time data repository 308 to identify various videos that have been presented at various different client devices that are remotely located relative to one or more computing devices that distribute the various videos for an online video distribution service. For each of the various videos, the presentation time data repository 308 can identify presentation session start data of a user within the online video distribution service. For example, the presentation session start data can specify a lead video that initiated video presentation to the user during a given presentation session.

Using information from the presentation time data repository 308, the presentation time modeling apparatus 306 can identify remotely initiated video presentations of a lead video based on referrer information included in a request to present the lead video, wherein the referrer information specifies one of a third-party website that directed a user to the online video distribution service, a third-party native application that directed a user to the online video distribution service, or shared link that directed a user to the online video distribution service.

The presentation time data repository 308 stores presentation time data, received at the network interface 324, which identifies how long various viewers have viewed videos hosted and presented by the video search system 302. In some implementations, the presentation time data repository 308 can include a database that logs presentation time reports provided to the video search system 302 from respective viewers' computing devices. Each time a presentation time report is received from a viewer's computing device, an entry can be added or updated in the database of the presentation time data repository 308. In some implementations, video playback applications on viewer's computing devices can be configured to automatically generate and provide presentation time reports to the video search system 302 as the viewer is presented a given video and/or after the viewer has completed watching all or a portion of a given video.

For example, when a viewer begins playing a video, the video playback application can automatically transmit a timestamp indicating a start time of the video to the video search system 302, which is logged in the database. As the viewer continues to be presented with the video, the video playback application can periodically (e.g., every 1 second or less frequently) ping the video search system 302 to confirm that the user is continuing to play the video. When the viewer stops playing the video, the video playback application can send a message to the video search system 302 that indicates the viewer has stopped the video, and the message can be logged in the database to indicate the total presentation time of the video by the viewer in a presentation session. In some implementations, the video playback application may store logs of one or more videos a user viewed and respective presentation times of the videos over a period of time (e.g., over a browsing session, an hour, a day, a week, a month, a year, etc.). The stored logs can then be transmitted to the video search system 302 on a regular basis, and the presentation time modeling apparatus 306 can register the logged data in the presentation time data repository 308. In some implementations, the presentation time data repository 308 may thus include data that identifies a plurality of different digitized videos, and for each respective video, a respective presentation time of the video by each of a plurality of viewers.

In some implementations, the presentation time modeling apparatus 306 can include an instrumentation engine 310 (or the instrumentation engine may be a separate component of the video search system 302). The instrumentation engine 310 is generally configured to generate and inject executable code or other instructions into web pages or applications associated with the playback of videos on client devices to cause the client devices to report presentation time data back to the video search system 302. For example, the instrumentation engine 310 may insert a script into a web page that presents a video, and when the script is executed in a web browser at the client computing device, the script monitors the status of the video being played on the client device and logs presentation time data. The script can then asynchronously report presentation time information to the video search system 302.

The presentation time modeling apparatus 306 is further operable to generate one or more presentation time models 312 using information from the presentation time data repository 308 and information about the viewers whose presentation time is reflected in the presentation time data repository 308. In some implementations, the presentation time modeling apparatus 306 can access or otherwise obtain information about viewers from the viewer profile manager 318. The viewer profile manager 318 is generally operable to assign unique identifiers to viewers and to correlate information about one or more characteristics of viewers with their respective identifiers. In some implementations, the viewer characteristics can generally be classified into one of two categories, namely demographic characteristics and behavioral characteristics. The demographic characteristics may encompass personal characteristics of the viewer (e.g., age group, gender) and/or external characteristics of the viewer, such as a geographic location where the video was presented, the time of day that the video was presented, a type of computing device on which the video was presented, a video playback application that was used when the video was presented, a browser application used for presenting the video, and the viewer's network connection bandwidth).

The behavioral characteristics generally relate to actions the viewer takes in connection with being presented with a particular video. One example of a behavioral characteristic is a set of one or more queries that the user submitted to the video search system and/or to another computing system (e.g., a general search engine) during a presentation session that led to the viewer being presented with a particular video. For example, User 1 may have visited the homepage of the video-sharing service provided by the video search system 302 and entered a first query of "football." After seeing a list of video results responsive to the first query, User 1 refines enters a second query of "hail Mary." The video search system 302 returns, to User 1's computing device, as video content responsive to the second query, a second list of video search results, from which User 1 selects a first video to watch. User 1's computing device can generate a presentation time report that is sent to the video search system 302, including information that identifies the first video, information that identifies User 1 (e.g., User 1's unique ID), information that identifies how long User 1 viewed the first video, and information that identifies the first and second queries. The video search system 302 can then process and store all or some of the information from the report in the presentation time data repository 308, the behavioral data repository 322, or both. As such, the video search system 302 can correlate the presentation time for the first video with a viewer category associated with the first query, the second query, or both (or keywords extracted from the first and/or second queries). Other examples of behavioral characteristics include viewer navigation data, which identifies one or more web pages that the user visited in a session that led the viewer to a given video; view history data, which indicates one or more other videos a user viewed in a presentation session in which the user also viewed a particular video that is the subject of certain presentation time data; click data or conversion data of content items (e.g., ads) that the user selected in connection with viewing a particular video. In some implementations, the viewer profile manager 318 may store data that identifies one or more content targeting parameters that were used to select video content or other content to serve to a viewer. The viewer profile manager 318, the presentation time modeling apparatus 306, or both, may correlate specific presentation time segments with behavioral characteristics of the viewer that generated the presentation time. In some implementations, the data managed by the demographic data repository 320 and the behavioral data repository 322 may be stored in one or more databases on devices in one or more locations.

In some implementations, the viewer profile manager 318 may define a plurality of viewer categories by grouping viewers according to their characteristics, as indicated by the demographic data repository 320 and/or the behavioral data repository 322. In some implementations, each unique viewer is assigned to only one of the plurality of viewer categories (i.e., the respective sets of characteristics of the viewer categories is non-overlapping). As an example, four viewer categories may be defined based on respective combinations of the age group characteristic and the gender characteristic, where each characteristic has two possible alternative values. A first group may consist of male viewers in an age range of 25-35, a second group may consist of female viewers in an age range of 25-35, a third group may consist of male users over age 35, and a fourth group may consist of female users over age 35. Of course, as the viewer profile manager 318 defines viewer categories based on increasing numbers of characteristics and/or increasing numbers of possible values for those characteristics, the total number of viewer categories may increase rapidly. For example, by segmenting users into one of 5 age groups (rather than 2), the number of viewer categories may increase from 4 to 10. Generally, the viewer categories may be defined as coarsely or granularly as needed in light of the available viewer data. For example, combinations of tens or hundreds of characteristics may be used to define very granular viewer categories, or combinations of just a few characteristics may be used to define coarser viewer categories.

In some implementations, the viewer profile manager 318 may define a plurality of viewer categories by grouping viewers according to their characteristics, where at least some of the viewer categories partially overlap each other. As such, the viewer profile manager 318 may assign a single viewer to two or more partially overlapping viewer categories as appropriate. For example, a first viewer category may consist of viewers that (1) arrived at a video by submitting a search query having a first keyword and (2) are in the age range of 21-24. A second viewer category may consist of viewers that (1) arrived at a video by submitting a search query having the first keyword and (2) are female. Therefore, User 3, a female viewer in the age range of 21-24 who, in this example, arrived at a video by submitting a search query having the first keyword, fits into both the first and second viewer categories because they are not mutually exclusive categories.

Viewer characteristics and other viewer profile information may be obtained by any of various techniques or combinations of techniques. In some implementations, viewers may maintain accounts with the video search system 302, and users may voluntarily provide demographic information to the video search system 302 as part of their account data. In some implementations, viewer information may be derived from communications received from viewers' computing devices, including requests for video content and presentation time reports sent from viewers' computing devices. For example, location data may be included or derived from messages received from viewer's computing devices, and based on the location data a geographic location can be correlated with a viewer. In some implementations, the video search system 302 may obtain viewer information from external sources other than the viewers' computing devices themselves. For instance, the video search system 302 may obtain social data from social networks or may otherwise determine information about viewers from web pages or other publicly available documents on the Internet.

In situations in which the systems and other techniques discussed here collect personal information about users (e.g., viewers), or may make use of personal information, the users may be provided with an opportunity to control whether programs or features collect user information (e.g., information about a user's presentation time, social network, social actions or activities, profession, a user's preferences, a user's search history, a user's navigation history, or a user's current location), or to control whether and/or how to receive content from the video server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the system.

Referring again to the presentation time modeling apparatus 306 of the video search system 302, the presentation time modeling apparatus 306 may generate, store, and maintain (e.g., update) one or more presentation time models 312 based on video presentation time data, as indicated by the presentation time data repository 308, and based on characteristics of viewers whose activities produced the presentation time data, as indicated by the viewer profile manager 318. Generally, the presentation time models 312 store data that indicate how long various groups of viewers were presented individual videos or groups of videos. In some implementations, the presentation time modeling apparatus 306 generates the presentation time models 312 by grouping the presentation time for respective videos or groups of videos based on characteristics of the viewers of the respective videos or groups of videos. In some implementations, the presentation time modeling apparatus 306 identifies appropriate viewer groups from the viewer profile manager 318. Therefore, the viewer groups employed by the presentation time modeling apparatus 306 may correspond to the viewer categories defined by the viewer profile manager 318, such that the presentation time models 312 indicate how long various viewers within each of the viewer categories were presented individual videos or groups of videos. For example, the presentation time data repository 308 may show that, over a certain period of time (e.g., an hour, a day, a week, or a month) 5,000 unique viewers were presented a particular video for an accumulated presentation time of 8 hours among all the viewers. The presentation time models 312 may, in turn, specify a distribution of the presentation time for the particular video among various viewer categories, as indicated by the viewer profile manager 318. For instance, the presentation time model 312 may indicate that 37 minutes of the 8 hours of total presentation time are associated with male viewers located in urban geographic areas, 4.5 hours of the total presentation time are associated with female viewers in rural geographic areas, 70 minutes of the total presentation time are associated with male viewers in rural geographic areas, and the balance of the 8 hours of presentation time is associated with associated with female viewers located in urban geographic areas. The presentation time model 312 thus indicates for the particular video relative interests in the video by different categories of viewers as indicated by the relative presentation times of the video by viewers in each category. Similarly, the presentation time modeling apparatus 306 may boost the presentation time of viewers who have achieved a certain status on the video-sharing service or a related service (e.g., a social network) as a reward to those viewers for achieving the status or because the status signifies a level of trust in the viewers' viewing habits. For example, the presentation times of registered members of the video-sharing service may be boosted relative to the presentation times of non-registered viewers.

As previously described, the viewer profile manager 318 can in some implementations define partially overlapping viewer categories such that a given viewer can belong to multiple different viewer categories. In such implementations, the presentation time modeling apparatus 306 may apportion the viewer's presentation time according to among each of the viewer categories to which the viewer belongs according to various criteria. For example, the presentation time modeling apparatus 306 may assign 40-percent of a viewer's presentation time to a first viewer category to which the user belongs, and can assign the remaining 60-percent of the viewer's presentation time to a second viewer category to which the user belongs. In some implementations, the apportionment of a viewer's presentation time among each applicable viewer category can be based on scores assigned to the applicable viewer category. The scores may reflect, for example, the relative values of each viewer category to the video search system 302. For example, a given viewer may belong to both first and second viewer categories, to which the presentation time modeling apparatus 306 has assigned scores of 5 and 10, respectively. Therefore, according to the viewer category scores, ⅓ of the viewer's presentation time may be apportioned to the first viewer category and ⅔ of the viewer's presentation time may be apportioned to the second viewer category. In some implementations, the apportionment of a viewer's presentation time among each applicable viewer category can be based on other information about the viewer or about the data that was used to classify a user into one or more viewer categories. For example, the viewer profile manager 318 may process data about a viewer and may determine that there is a 75-percent likelihood that the viewer is male and a 25-percent likelihood that the viewer is female. Because the viewer profile manager 318 does not have complete confidence in the viewer's gender classification, 75-percent of the viewer's presentation time may be assigned to a viewer category defined at least in part by a male characteristic, and 25-percent of the viewer's presentation time may be assigned to a viewer category defined at least in part by a female characteristic.

In some instances, it may be useful to keep track of viewer's presentation times with respect to groups of videos rather than or in addition to individual videos. As such, the presentation time modeling apparatus 306 may, in some implementations, determine presentation time models 312 that indicate, for each of multiple groups of videos, a distribution of presentation times of the video among various viewer categories. For example, the presentation time modeling apparatus 306 may analyze data from the presentation time data repository 308 to determine total presentation times of videos within respective groups of videos over a period of time by a population of viewers. The modeling apparatus can then group the presentation time for each group of video by viewer category to generate presentation time distributions. The presentation time modeling apparatus 306 may group videos according to various criteria, as indicated by the video storage system 304. For example, videos may be grouped by creator, by channel, by age (e.g., amount of time since a video was submitted for distribution on the video-sharing service), by genre (e.g., product reviews, music videos, animation, television shows, action, comedy, horror, children's videos), by popularity (e.g., total number of views), or a combination of two or more of these. By determining presentation time distributions for groups of videos, the video content selector 316 can, in some implementations, more readily determine video content to serve to a viewer's computing device in response to a request for video content by selecting videos from within one or more groups of videos that have relatively high presentation times by viewers that have characteristics that match characteristics of the viewer to whom the selected video content is to be presented.

As the video search system 302 may constantly collect new presentation time data from viewers, the presentation time modeling apparatus 306 may be configured to update or regenerate the presentation time models 312 (and the creator performance models 314) on a continuous or periodic basis. In some implementations, the models 312, 314 may be maintained based on a rolling window of presentation time data. For example, once each day the presentation time modeling apparatus 306 may update the models 312, 314 based on presentation time that occurred in the past 7 days. Every day, then, the models 312, 314 can be updated to incorporate presentation time data from a most recent day and to discard presentation time data more than a week old. In some implementations, the presentation time modeling apparatus 306 can update the models 312, 314 with a completely fresh set of data (e.g., every week the models may be regenerated using data from only the most recent week). In some implementations, the presentation time modeling apparatus 306 may update the models 312, 314 from time to time to incorporate a most recently collected set of presentation time data without discarding older presentation time data.

The presentation time models 312 may organize the groupings of video presentation time information in various ways. In some implementations, each respective video or group of videos can be correlated with a plurality of values that respectively indicate the total (accumulated) presentation time of the respective video or group of videos by viewers in a respective one of a plurality of viewer categories. In some implementations, the presentation time models 312 may indicate the converse. Namely, for each of a plurality of viewer categories, presentation times of viewers within the respective viewer category may be distributed among a set of videos or groups of videos.

In some implementations, the presentation time models 312 can indicate, for each video or group of videos served by the video search system 302 over a period of time, a distribution of presentation times for the respective video or group of videos among each of a plurality of viewer categories. If no viewers have viewed a given video within a particular category during that period of time, the presentation time assigned to that category may be null (zero). In some implementations, the presentation time models 312 may identify actual presentation time totals for each viewer category (e.g., viewers in a first category were presented the video for a total of 132 minutes, while viewers in a second category were presented the video for a total of 61 minutes). In some implementations, the presentation time models 312 may identify relative presentation time totals for each viewer category (e.g., 68-percent of the presentation time for the video was by viewers in the first category, while 32-percent of the presentation time for the video was by viewers in the second category). In some implementations, the video search system 302 may value certain viewers' presentation time more than others, and therefore the presentation time modeling apparatus 306 may weigh the presentation time of individual viewers or groups of viewers when determining the presentation time distributions for the presentation time models 312. For example, a celebrity or an expert in a field that is the subject of a video or group of videos may have their actual presentation times tripled for the video or group of videos, or other users' presentation times may be devalued.

In some implementations, the presentation time modeling apparatus 306 can use video presentation time data to determine one or more creator performance models 314. Generally, the creator performance models 314 identify creator performance scores (i.e., scores for parties that have submitted videos to the video-sharing service for distribution). The creator performance scores can be determined by the presentation time modeling apparatus 306 based on how long various categories of viewers have viewed the creators' videos. In this way, the video search system 302 can leverage presentation time information as a metric for assessing the performance of creators on the video-sharing service. Moreover, and as further described with respect to the video content selector 316, the creator performance scores can be used in some implementations as a heuristic for ranking and determining video content to serve to viewers. In some implementations, the video search system 302 may also determine how to allocate resources to creators based at least in part on the performance scores resources to distribute to creators based on the performance scores.

In some implementations, the presentation time modeling apparatus 306 may determine creator performance scores as follows. First, the presentation time modeling apparatus 306 accesses from the presentation time data repository 308 information about how long viewers were presented various videos over a period of time. The presentation time modeling apparatus 306 then identifies from the viewer profile manager 318 a set of one or more viewer categories that will form the basis of the creator performance scores. In some implementations, the identified set of viewer categories may be a complete set of viewer categories that encompasses all viewers, or the identified set of viewer categories may comprise less than all of the viewer categories in the complete set. For example, if the complete set of viewer categories included (1) males aged 46-55 (2) males aged 38-45, (3) females aged 46-55, and (4) females aged 38-45, then the presentation time modeling apparatus 306 could determine the creator performance scores based on the presentation times of viewers within all four categories (the complete set), or based on the presentation times of viewers within fewer than all four categories.

The presentation time modeling apparatus 306 then generates groups of presentation time for each of the identified viewer categories by assigning respective pieces of presentation time to appropriate ones of the viewer categories based on the characteristics of the viewers whose views resulted in the respective presentation times. For example, the presentation times of one or more videos by one or more viewers who belong to a first viewer category may be assigned to a presentation time group for the first viewer category, the presentation times of one or more videos by one or more viewers who belong to a second viewer category may be assigned to a presentation time group for the second viewer category, and so on. Based on the groupings, the presentation time modeling apparatus 306 then accumulates the presentation times in each viewer category to determine a total presentation time that indicates, for each viewer category, a total amount of time that viewers within the category were presented with videos over a defined time interval (e.g., a day, a week, a month).

The presentation time modeling apparatus 306 also breaks down the total presentation time in each viewer category by creator. That is, in each viewer category, the presentation time modeling apparatus 306 identifies all the creators of the videos that were presented by viewers within the category, and determines for each of the identified creators how much of the total presentation time for the category was presentation time of videos of the respective creator. As an example, the presentation time modeling apparatus 306 may determine that, over the course of a month, viewers aged 21 and under were presented a total of 2,000 hours of video, while viewers aged 22+ were presented a total of 4,000 hours of video over that month. Moreover, the total presentation time of multiple videos distributed by a first creator on the video-sharing service over that month by viewers aged 21 may be determined as 130 hours. The total presentation time of the multiple videos distributed by the first creator on the video-sharing service over that month by viewers aged 22+ may be determined as 25 hours. Thus, the first creator's videos can be seen to contribute to a greater share of the total presentation time for the 21 category than the 22+ category.

Further in the process of determining creator performance scores, the presentation time modeling apparatus 306 can identify scores for each of the viewer categories that the presentation time modeling apparatus 306 can use in determining scaling factors for videos. Presentation times from different viewer categories may be scored differently from each other, for example, to reward creators whose videos generate more presentation time from viewer categories that the video-sharing service deems more valuable than other categories. Thus, if the video-sharing service targets video content to particular demographics of viewers, creators can receive more credit for presentation time generated by viewers within the targeted demographics than for presentation time by viewers in other demographics.

Using the viewer category scores and the presentation times associated with the various viewer categories, the presentation time modeling apparatus 306 can compute the creator performance scores. In some implementations, the creator performance score for a given creator can be computed by (1) determining, for each respective viewer category, the product of the (i) share of the total presentation time for the respective viewer category that is attributable to videos associated with the given creator and (ii) the viewer category score for the respective viewer category, and (2) taking the sum of the products across all the viewer categories. For example, consider a scenario in which viewers in a first category were presented 100 minutes of videos over a period of time and viewers in a second category were presented 200 minutes of videos over the same period of time. The share of the presentation time attributable to videos of a particular creator by viewers in the first category is 20 minutes and the share of the presentation time attributable to videos of the same creator by viewers in the second category is also 20 minutes. The viewer category score for the first video is 50 and the viewer category score for the second video is 250. The creator performance score for the particular creator can be calculated as (20/100)*(50)±(20/200)*(250)=35. In some implementations, the video-sharing service can use the creator performance scores as a model or heuristic for distributing resources (e.g., points, incentives, membership status, access to creative tools, or revenue) to the creators.

The video content selector 316 is operable to select video content to serve to various computing devices in response to requests for video content. Generally, the video content selector 316 can select video content to serve based on presentation time information, as indicated by the presentation time models 312, based on creator performance scores, as indicated by the creator performance models 314, or both. In response to a request from a particular viewer, the video content selector 316 may select video content for one or more videos to serve to the particular viewer's computing device based on identifying that historically the one or more videos, or other videos that are similar to the one or more videos, were presented for relatively long times to various viewers having characteristics that match or are similar to characteristics of the viewer for whom the video content is targeted. For example, the video content selector 316 may identify, from the request manager 326, that a user who submitted a request for video content is a male, 21, from Albuquerque, N. Mex.

The video content selector 316 can then query the presentation time models 312 to identify videos that the presentation time data indicates were preferred (e.g., presented for longer times) by other users that match the same profile of the requesting user. Generally, videos having higher presentation times by matching or similar viewers are more likely to be selected in response to a request than are videos having lower presentation times by matching or similar viewers. Continuing the preceding example, the video content selector 316 may rank a plurality of videos that are determined to be relevant to the request from the male, 21, from Albuquerque.

The videos may be ranked based on multiple heuristics, including how closely the subject matter of candidate videos matches one or more topics of the request, presentation time heuristics, and/or creator performance heuristics. With respect to the presentation time heuristics, candidate videos can be promoted in the ranking the longer that the videos were presented to 21-year-old men from Albuquerque or by viewers in similar demographics. With respect to the creator performance heuristics, candidate videos by creators having higher performance scores may be promoted in the ranking. The video content selector 316 can then select video content for one or more of the top-ranked candidate videos to serve to the requesting user's computing device. In some implementations, the served content may be the digital videos themselves. In some implementations, the served content may not include the digital videos themselves, but may include references to the digital videos (e.g., search results that include a title, description, and/or representative image of the selected videos).

In some implementations, the video content selector 316 may apply back-off techniques to identify viewer characteristics (and hence viewer categories) that are similar to characteristics of a user that has requested video content. For example, rather than limiting the analysis of presentation time by 21-year-old male viewers in Albuquerque, N. Mex., the video content selector 316 may query the presentation time models 312 to identify presentation times of videos by 21-year-old male viewers in the entire southwest United States. By expanding the relevant geographic area (e.g., by backing-off), more data points can be analyzed to determine more reliable results.

Figure 4:
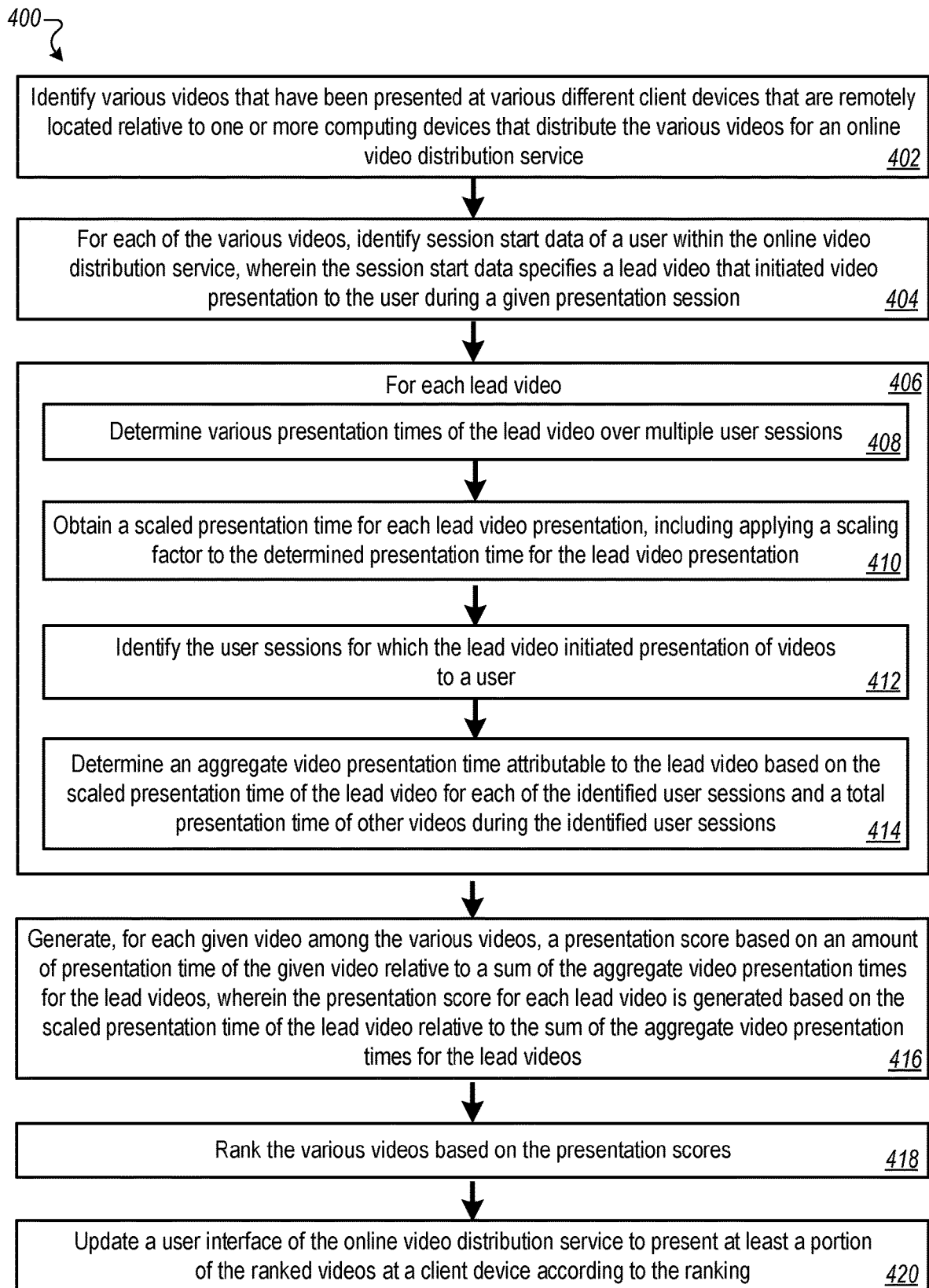
FIG. 4 depicts a flowchart of an example process in which videos are presented and scaling factors are used to determine scaled presentation times for videos.

Turning to FIG. 4, a flowchart is shown of an example process 400 in which videos are presented and scaling factors are used to determine scaled presentation times for videos. In some implementations, the process 400 may be carried out by the systems and devices discussed throughout this document, including by various components of the video search system 302 of FIG. 3, and specifically the presentation scoring apparatus 305.

The process can begin at stage 402, when various videos are identified that have been presented at various different client devices that are remotely located relative to one or more computing devices that distribute the various videos for an online video distribution service. For example, the presentation scoring apparatus 305, using at least the presentation time data repository 308, can identify presented videos 104.

At stage 404, for each of the various videos, session start data of a user within the online video distribution service is identified. The session start data specifies a lead video that initiated video presentation to the user during a given presentation session. For example, the presentation scoring apparatus 305 can determine the videos 104 that are associated with the presentation session 102. The lead video identifier/classifier 307 can identify the presented video A 104*a* as the lead video, as opposed to other ones of the presented videos 104 that follow the lead video. Identification of the lead video can be made by evaluating start and stop times of videos, such as using information from the presentation time data repository 308.

At stage 406, each lead video is processed. For example, the presentation scoring apparatus 305 can process all known lead videos, including the presented video A 104*a*, using the following stages 408-414.

At stage 408, various presentation times of the lead video over multiple user sessions are identified. As an example, the presentation scoring apparatus 305, using information from the presentation time data repository 308, can identify the presentation times 106 applicable to each of the presented videos 104 for the presentation session 102, as well as presentation times for lead videos of other presentation sessions.

At stage 410, a scaled presentation time for each lead video presentation is obtained, including applying a scaling factor to the determined presentation time for the lead video presentation. The scaling factor engine 309, for example, can determine the scaled presentation times 110 associated with each of the presented videos 104, such as multiplying the presentation times 106 by the corresponding scaling factors 108 for a given video. The presentation time 106 (e.g., five minutes) for presented video 104*a*, for example, being a lead video (as being referred by through a social messaging system and being the first video in the presentation session 102), can be scaled using a scaling factor 108 of 2. Further, the presentation time 106 (e.g., five minutes) for the presented video B 104*b*, for example, having the same author as (and presented immediately after) the lead video, can also be scaled with a scaling factor 108 of 2 (or may have a different scaling factor). While the smallest scaling factor 108 presented in FIG. 1 is one (e.g., indicating no additional boost in rank is to be applied or given to a particular video), scaling factor 108 values of less than one can be used, such as to reduce the rank (and likely appearance as a recommendation to users) if the video has been determined to be not of interest to the user (or generally to other users).

At stage 412, the user sessions for which the lead video initiated presentation of videos to a user are identified. For example, once video A 104*a* has been identified as a lead video, the presentation session 102 can be identified as containing the lead video. Further, other presentation sessions for other lead videos can be identified.

At stage 414, an aggregate video presentation time attributable to the lead video is determined based on the scaled presentation time of the lead video for each of the identified user sessions and a total presentation time of other videos during the identified user sessions. For example, the aggregate video presentation time 111 of the presented videos 104 can be computed by summing the scaled presentation times 110 for the presentation session 102.

At stage 416, for each given video among the various videos, a presentation score 112 is generated based on an amount of presentation time of the given video relative to a sum of the aggregate video presentation times 111*a* for the lead videos. For example, the scaling factor engine 309 can calculate the presentation scores 112 for each of the presented videos 104. In this example, in order to show the calculations used, the generated presentation scores 112 are based on the aggregate video presentation time 111 associated with the presented videos 104 in the presentation session 102.

A lead video presentation score 112a for each lead video is generated based on the scaled presentation times of a respective lead video relative to the sum of the aggregate video presentation times 111a for the lead videos. For example, the scaling factor engine 309 can calculate a respective lead video presentation score 112a for each of the presented videos 104 based on the respective scaled presentations time 110 relative to the aggregate video presentation times 111a.

In some implementations, presentation scores 112 can be determined or adjusted so that presentation times 106 dominate less of each presentation score 112 and scaling factors 108 provide a larger contribution. For example, instead of a mathematical product of the presentation time 106 and the scaling factor 108, the presentation score 112 can be determined using a function that uses a square of the scaling factor 108 and/or a normalized presentation time 106, or larger scaling factors 108 can be used. Other ways of determining presentation scores can be used.

At stage 418, the various videos are ranked based on the presentation scores. For example, the videos 104a-104c can be ranked based on the presentation scores. In another example, the videos 104a-104c can be ranked based on the scaling factor, such as to produce a higher ranking for the presented videos 104a and 104b (e.g., referred videos and videos of the same author) than for the video 104c (e.g., simply a video site-recommended video).

At stage 420, a user interface of the online video distribution service is updated to present at least a portion of the ranked videos at a client device according to the ranking. For example, in a user interface of the online video distribution service, such as at a video-sharing website, the videos 104a-104c can be listed before other lower-ranked videos, such as presented video C 104c.

In some implementations, the process 400 can further include applying a higher scaling factor to presentation times for remotely initiated video presentations of a lead video. For example, higher scaling factors can be applied when the user is brought to the online video distribution service from a location (e.g., a social messaging system) that is remote from the online video distribution service. Determining and applying higher scaling factors can include, for each lead video specified by the presentation session start data for the various videos, classifying the lead video as either an in-service initiated video presentation (e.g., at the video-sharing website) or a remotely initiated video presentation (e.g., initiated by clicking on a link provided by a friend in a social messaging system). Applying a scaling factor to the determined presentation time for the lead video presentation includes applying a first (e.g., lower) scaling factor to the determined presentation time for in-service initiated video presentations of a lead video, and applying a second (e.g., higher) scaling factor to the determined presentation time for remotely initiated video presentations of a lead video.

In some implementations, the process 400 can further include identifying remotely initiated video presentations of a lead video based on referrer information included in a request to present the lead video. For example, different referrers can result in using different scaling factors, such as videos for a video creator having a greater following receiving a higher scaling factor than videos of other less-followed creators. In some implementations, referrer information can be included in the URL that is used to initiate the presentation session on the online video distribution service. For example, the referrer information can specify one of a third-party website that directed the user to the online video distribution service, a third-party native application that directed the user to the online video distribution service, or shared link that directed the user to the online video distribution service.

In some implementations, the process 400 can further include applying scaling factors to different presentations differently based on how indicative of the video the query is. For example, search queries can be identified that have resulted in a given lead video being identified to various users in search results. For each of the identified search queries, for example, a portion of the various users that initiated presentation of the given lead video through interaction with the search results can be determined. Based on the determined portions, search scaling factors can be determined that are applied to the determined presentation time of the lead video for the presentations of the given lead video that was initiated through user interaction with the search results that identified the given lead video.

In some implementations, the process 400 can further include identifying a creator that supplies one or more of the various videos. For example, a creator score can be generated for the creator based on the presentation score of the one or more of the various videos provided by the creator, and the creator can be ranked among other creators based, at least in part, on the creator score. In some implementations, creator scores can be used instead of or in addition to scaling factors 108.

In some implementations, the process 400 can further include distributing, to the creator, a portion of proceeds attributable to the one or more of the various videos supplied by the creator based on the presentation scores of the one or more of the various videos. For example, instead of compensating a creator of a video based solely or primarily on the length of a video (e.g., relative to the length of the presentation and using proceeds from the session), the compensation can be based, at least in part, on the compensation score (e.g., determined from scaling factors, based on the source of the video, such as whether the video is a lead video).

Figure 5:
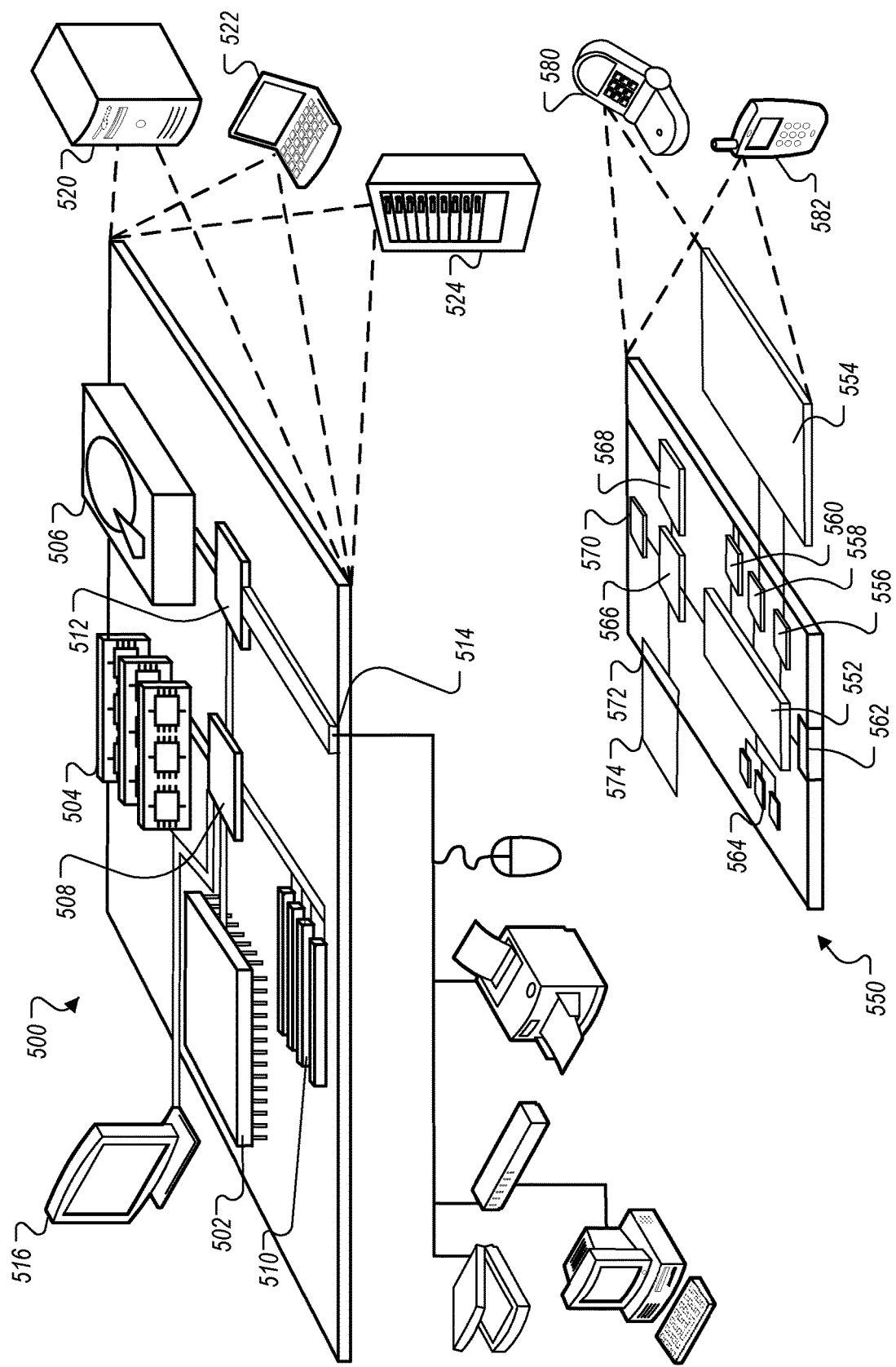
FIG. 5 shows an example of a computing device and a mobile computing device that may be used to implement the computer-implemented methods and other techniques described herein.

FIG. 5 shows an example of a computing device 500 and a mobile computing device that may be used to implement the computer-implemented methods and other techniques described herein. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In situations in which the systems, methods, devices, and other techniques here collect personal information (e.g., context data) about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system comprising:
   one or more processors; and
   one or more memory devices including instructions that, when executed, cause the one or more processors to perform operations comprising:

identifying, for a given video, session start data specifying that the given video was a lead video that initiated video presentation to a user during multiple user sessions;

determining various presentation times of the given video over multiple user sessions in which the given video was the lead video;

determining an aggregate video presentation time attributable to the given video as a lead video based on a combination of the various presentation times of the given video for the multiple user sessions in which the given video was the lead video and a total presentation time of other videos during the multiple user sessions; and generating a first presentation score for the given video based on the aggregate video presentation time attributable to the given video as the lead video and the aggregate video presentation times for other lead videos;

generating, for each of multiple other videos, a second presentation score based on an amount of presentation time of the video;

ranking the given video based on the first presentation score and the other videos based on the second presentation scores; and updating a user interface to present a highest ranked portion of the ranked videos at a client device according to the ranking.

2. The system of claim 1, the operations further comprising:

classifying the lead video as one of an in-service initiated video presentation or a remotely initiated video presentation;

applying a first scaling factor to the determined presentation time for in-service initiated video presentations of the lead video; and applying a second scaling factor to the determined presentation time for remotely initiated video presentations of the lead video, wherein the first scaling factor is lower than the second scaling factor.

3. The system of claim 2, the operations further comprising:

identifying remotely initiated video presentations of the lead video based on referrer information included in a request to present the lead video, wherein the referrer information specifies one of a third-party website that directed a user to an online video distribution service, a third-party native application that directed a user to the online video distribution service, or shared link that directed a user to the online video distribution service;

collecting timestamps indicating playback start times of the lead video;

obtaining pings generated during playbacks of the lead video; and determining the various presentation times for the playbacks of the lead video based on the timestamps and the pings.

4. The system of claim 2, the operations further comprising:

identifying search queries that resulted in the lead video being identified to various users in search results;

for each of the search queries, determining a portion of the various users that initiated presentation of the given video through interaction with the search results; and determining, based on the determined portions, search scaling factors to apply to the determined presentation time of the lead video for the presentations of the given video that were initiated through user interaction with the search results that identified the given lead video.

5. The system of claim 1, the operations further comprising identifying a creator that supplies the given video.

6. The system of claim 5, the operations further comprising:

generating a creator score for the creator based on the first presentation score and the second presentation score; and ranking the creator among other creators based, at least in part, on the creator score.

7. The system of claim 5, the operations further comprising distributing, to the creator, a portion of proceeds attributable to the given video supplied by the creator based on the first presentation score and the second presentation score.

8. A method comprising:

identifying, for a given video, session start data specifying that the given video was a lead video that initiated video presentation to a user during multiple user sessions;

determining, by one or more data processing apparatus of an online video service, various presentation times of the given video over multiple user sessions in which the given video was the lead video;

determining, by the one or more data processing apparatus, an aggregate video presentation time attributable to the given video as a lead video based on a combination of the various presentation times of the given video for the multiple user sessions in which the given video was the lead video and a total presentation time of other videos during the multiple user sessions; and generating, by the one or more data processing apparatus, a first presentation score for the given video based on the aggregate video presentation time attributable to the given video as the lead video and the aggregate video presentation times for other lead videos;

generating, for each of multiple other videos by the one or more data processing apparatus, a second presentation score based on an amount of presentation time of the video;

ranking, by the one or more data processing apparatus, the given video based on the first presentation score and the other videos based on the second presentation scores; and updating a user interface to present a highest ranked portion of the ranked videos at a client device according to the ranking.

9. The method of claim 8, further comprising:

classifying the lead video as one of an in-service initiated video presentation or a remotely initiated video presentation;

applying a first scaling factor to the determined presentation time for in-service initiated video presentations of the lead video; and applying a second scaling factor to the determined presentation time for remotely initiated video presentations of the lead video, wherein the first scaling factor is lower than the second scaling factor.

10. The method of claim 9, further comprising:

identifying remotely initiated video presentations of the lead video based on referrer information included in a request to present the lead video, wherein the referrer information specifies one of a third-party website that directed a user to an online video distribution service, a third-party native application that directed a user to the online video distribution service, or shared link that directed a user to the online video distribution service;

collecting timestamps indicating playback start times of the lead video;

obtaining pings generated during playbacks of the lead video; and determining the various presentation times for the playbacks of the lead video based on the timestamps and the pings.

11. The method of claim 9, further comprising:

identifying search queries that resulted in the lead video being identified to various users in search results;

for each of the search queries, determining a portion of the various users that initiated presentation of the given video through interaction with the search results; and determining, based on the determined portions, search scaling factors to apply to the determined presentation time of the lead video for the presentations of the given video that were initiated through user interaction with the search results that identified the given lead video.

12. The method of claim 8, further comprising identifying a creator that supplies the given video.

13. The method of claim 12, further comprising:

generating a creator score for the creator based on the first presentation score and the second presentation score; and ranking the creator among other creators based, at least in part, on the creator score.

14. The method of claim 11, further comprising distributing, to the creator, a portion of proceeds attributable to the given video supplied by the creator based on the first presentation score and the second presentation score.

15. One or more non-transitory computer-readable media having instructions stored thereon that, when executed by one or more processors, cause performance of operations comprising:

identifying, for a given video, session start data specifying that the given video was a lead video that initiated video presentation to a user during multiple user sessions;

determining various presentation times of the given video over multiple user sessions in which the given video was the lead video;

determining an aggregate video presentation time attributable to the given video as a lead video based on a combination of the various presentation times of the given video for the multiple user sessions in which the given video was the lead video and a total presentation time of other videos during the multiple user sessions; and generating a first presentation score for the given video based on the aggregate video presentation time attributable to the given video as the lead video and the aggregate video presentation times for other lead videos;

generating, for each of multiple other videos, a second presentation score based on an amount of presentation time of the video;

ranking the given video based on the first presentation score and the other videos based on the second presentation scores; and updating a user interface to present a highest ranked portion of the ranked videos at a client device according to the ranking.

16. The one or more non-transitory computer-readable media of claim 15, the operations further comprising:

classifying the lead video as one of an in-service initiated video presentation or a remotely initiated video presentation;

applying a first scaling factor to the determined presentation time for in-service initiated video presentations of the lead video; and applying a second scaling factor to the determined presentation time for remotely initiated video presentations of the lead video, wherein the first scaling factor is lower than the second scaling factor.

17. The one or more non-transitory computer-readable media of claim 16, the operations further comprising:

identifying remotely initiated video presentations of the lead video based on referrer information included in a request to present the lead video, wherein the referrer information specifies one of a third-party website that directed a user to an online video distribution service, a third-party native application that directed a user to the online video distribution service, or shared link that directed a user to the online video distribution service;

collecting timestamps indicating playback start times of the lead video;

obtaining pings generated during playbacks of the lead video; and determining the various presentation times for the playbacks of the lead video based on the timestamps and the pings.

18. The one or more non-transitory computer-readable media of claim 16, the operations further comprising:

identifying search queries that resulted in the lead video being identified to various users in search results;

for each of the search queries, determining a portion of the various users that initiated presentation of the given video through interaction with the search results; and determining, based on the determined portions, search scaling factors to apply to the determined presentation time of the lead video for the presentations of the given video that were initiated through user interaction with the search results that identified the given lead video.

19. The one or more non-transitory computer-readable media of claim 15, the operations further comprising identifying a creator that supplies the given video.

20. The one or more non-transitory computer-readable media of claim 19, the operations further comprising:

generating a creator score for the creator based on the first presentation score and the second presentation score; and ranking the creator among other creators based, at least in part, on the creator score.

* * * * *